(12) United States Patent
Chung et al.

(10) Patent No.: US 11,204,543 B2
(45) Date of Patent: Dec. 21, 2021

(54) PROJECTION APPARATUS AND AUTO-FOCUSING METHOD

(71) Applicant: Coretronic Corporation, Hsin-Chu (TW)

(72) Inventors: Tzu-Hai Chung, Hsin-Chu (TW); Wen-Chang Chien, Hsin-Chu (TW); Yu-Chi Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 411 days.

(21) Appl. No.: 16/207,032

(22) Filed: Nov. 30, 2018

(65) Prior Publication Data
US 2019/0163044 A1    May 30, 2019

(30) Foreign Application Priority Data
Nov. 30, 2017    (CN) .......................... 201711233290.4

(51) Int. Cl.
*G03B 21/53*    (2006.01)
*G01C 3/08*    (2006.01)

(52) U.S. Cl.
CPC ............... *G03B 21/53* (2013.01); *G01C 3/08* (2013.01)

(58) Field of Classification Search
CPC ................................. G03B 21/53; G01C 3/08
USPC .......................................................... 353/101
See application file for complete search history.

(56) References Cited

U.S. PATENT DOCUMENTS

| 2012/0008109 A1 | 1/2012 | Hsiung |
| 2015/0288936 A1 | 10/2015 | Jakubiak |
| 2017/0045812 A1 | 2/2017 | Chen et al. |

FOREIGN PATENT DOCUMENTS

| CN | 1519637 A | 8/2004 |
| CN | 1763630 A | 4/2006 |
| CN | 101178535 A | 5/2008 |
| CN | 101281289 A | 10/2008 |
| CN | 102636939 A | 8/2012 |
| CN | 104536249 A | 4/2015 |
| CN | 105573041 A | 5/2016 |
| CN | 105842972 A | 8/2016 |
| EP | 2602090 A1 | 6/2013 |
| JP | H05188282 A | 7/1993 |
| JP | 2005351959 A * | 8/2004 ............. G03B 21/00 |

(Continued)

OTHER PUBLICATIONS

Machine Translation of JP 2005351959 A (Year: 2021).*

(Continued)

*Primary Examiner* — Jerry L Brooks

(57) ABSTRACT

A projection apparatus includes a light valve, a lens module, a distance measuring module, a lens position detection module and a processor. The light valve forms an image beam. The lens module projects the image beam onto a display surface. The distance measuring module detects a distance between the lens module and the display surface to obtain a first distance value. The lens position detection module detects a position of the lens module to obtain a second distance value. The processor receives the first distance value from the distance measuring module, receives the second distance value from the lens position detection module and obtains an effective focus range according to the second distance value.

16 Claims, 6 Drawing Sheets

(56) References Cited

FOREIGN PATENT DOCUMENTS

| KR | 20000028430 A | 5/2000 |
|---|---|---|
| TW | 201736907 A | 10/2017 |

OTHER PUBLICATIONS

Bo Qing Xue, Ming Fang Lu, Ling Zhu Yu, "Medical optical equipment and optical speculum", Shanghai Medical Device Practical Manual, Sep. 30, 1989, p. 296, Wen Hui publishing house, China.

Al Chu Chang, Shu Ling Tao, Lan Ying Chen, Ya Chin Chang, "Experiment 1: The structure and method of use of the microscope", Textbooks for Higher Medical Schools, Cell Biology and Medical Genetics Experiment Course, Sep. 30, 1995, p. 6, Tianjin people publishing house, China.

\* cited by examiner

| Second distance (cm) | Lens module position (Steps) | Near end boundary value (cm) | Far end boundary value (cm) |
|---|---|---|---|
| 8 | 10 | 6 | 11 |
| 12 | 50 | 11 | 14 |
| 36 | 260 | 25 | 42 |
| 50 | 340 | 43 | Infinity |

FIG. 6

PROJECTION APPARATUS AND AUTO-FOCUSING METHOD

CROSS-REFERENCE TO RELATED APPLICATION

This application claims the priority benefit of china application (CN201711233290.4 filed on Nov. 30, 2017). the entirety of the above-mentioned patent application is hereby incorporated by reference herein and made a part of this specification.

FIELD OF THE INVENTION

The invention relates to a projection apparatus, and more particularly to a projection apparatus with auto-focusing function.

BACKGROUND OF THE INVENTION

A projector is a display device for generating a large-size image. The imaging principle of the projector is that an illumination beam generated by a light source is converted into an image beam by a light valve, and the image beam is projected onto a projection screen or a wall through a lens to display the image. With the progress of the projection technology and the reduced manufacturing cost, the projector has gradually expanded from commercial field to home, and the smaller projector has gradually dominated the market.

Generally, when the projector is in use, the size of the projection screen and the distance between the projection screen and the optical projector will be limited by the available space. Thus, the lens of the projector often has an auto-focusing function to allow the user to adjust the size of the image projected by the lens or the clarity of the image.

The infrared auto-focusing, ultrasonic auto-focusing and camera auto-focusing are currently the common auto-focusing technologies. However, after the distance information is obtained by the above technologies, it takes a long time to compute the distance information by the processor. In addition, to find the best focus position, it takes a long time to adjust the position of the projection lens. In addition, the camera auto-focusing method has the disadvantage of having to capture the entire projection image or to compare the entire projection image with the edge sampling, and the data of the entire projection image is large, and therefore it takes more time to focus and it consumes more system performance. Therefore, it should be noted by the skilled person of the field to solve the above problems.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

An objective of the invention is to provide a projection apparatus with effect of fast auto-focusing.

Another objective of the invention is to provide an auto-focusing method applied to the projection apparatus so that the projection apparatus has an effect of fast auto-focusing.

Other objectives and advantages of the invention can be further understood from the technical features disclosed by the invention.

In order to achieve one of or some or all of the above objectives or other objectives, the invention provides a projection apparatus, which includes a light valve, a lens module, a distance measuring module, a lens position detection module and a processor. The light valve is adapted to form an image beam. The lens module is adapted to project the image beam onto a display surface. The distance measuring module is adapted to detect a distance between the lens module and the display surface to obtain a first distance value. The lens position detection module is adapted to detect a position of the lens module to obtain a second distance value. The processor is electrically connected to the distance measuring module and the lens position detection module. The processor receives the first distance value from the distance measuring module, receives the second distance value from the lens position detection module, and obtains an effective focus range according to the second distance value. When the processor determines that the first distance value is outside the effective focus range, the processor drives the lens module so that the first distance value enters the effective focus range.

In order to achieve one of or some or all of the above objectives or other objectives, the invention provides an auto-focusing method for adjusting a distance between a projection apparatus and a display surface. The projection apparatus includes a light valve, a lens module, a distance measuring module, a lens position detection module and a processor. The auto-focusing method includes steps of: configuring the processor to receive a first distance value from the distance measuring module and a second distance value from the lens position detection module, wherein the first distance value is a distance between the lens module and the display surface, and the second distance value is a position of the lens module; obtaining an effective focus range according to the second distance value; determining whether the first distance value is within the effective focus range; and when the processor determines that the first distance value is outside the effective focus range, configuring the processor to drive the lens module so that the first distance value enters the effective focus range.

In summary, according to the projection apparatus and auto-focusing method in the embodiment of the invention, the first distance value is obtained by the distance measuring module detecting the distance between the lens module and the display surface, the second distance value is then obtained by the lens position detection module detecting the position of the lens module, the processor obtains the effective focus range according to the second distance value, and then the processor determines the relationship between the first distance value and the effective focus value. When the processor determines that the first distance value is outside the effective focus range, the processor drives the lens module to move to cause the first distance value to be within the effective focus range. When the processor determines that the first distance value is within the effective focus range, the processor does not drive the lens module to move. Different from the auto-focusing method of the prior art, the projection apparatus and auto-focusing method in the embodiment of the invention can achieve faster auto-focusing.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a schematic diagram of the content of a look-up table of the projection apparatus of the embodiment.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
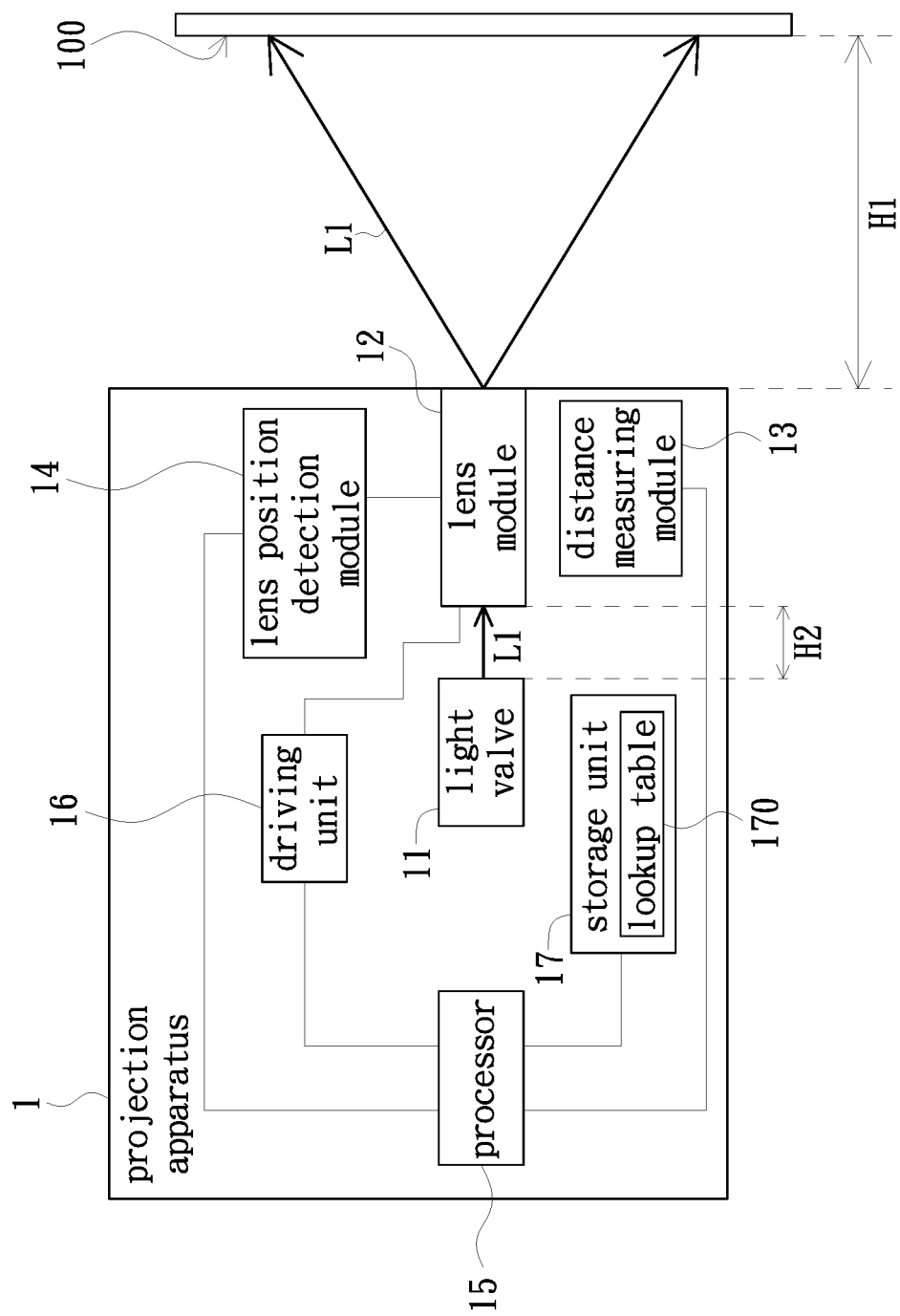
FIG. 1 is a structural diagram of a projection apparatus 1 of an embodiment of the invention.

FIG. 1 is a structural diagram of a projection apparatus 1 of an embodiment of the invention. As shown in FIG. 1, the projection apparatus 1 of the embodiment includes a light valve 11, a lens module 12, a distance measuring module 13, a lens position detection module 14 and a processor 15. The light valve 11 is used to convert an illumination beam provided by a light source (not shown) into an image beam L1. The lens module 12 is used to project and magnify the image beam L1 onto a display surface 100, wherein the display surface 100 is, for example, a projection curtain or a wall surface. The distance measuring module 13 is used to detect the distance H1 between the lens module 12 and the display surface 100 to obtain a first distance value, that is, the first distance value represents the distance between the projection apparatus 1 and the display surface 100. The lens position detection module 14 is used to detect the position of the lens module 12 to obtain a second distance value. In detail, in the embodiment, the current position of the lens module 12 is known (determined) by using the lens position detection module 14 to detect the resistance value. The distance between the current position of the lens module 12 and the initial position of the lens module 12 can also be determined from the signal of the resistance value, and the distance between the initial position of the lens module 12 and the light valve 11 can also be known (judged), and the distance between the initial position of the lens module 12 and the light valve 11 can also be known (determined). The second distance value is the total distance H2 of the distance between the current position of the lens module 12 and the initial position of the lens module 12 plus the distance between the initial position of the lens module 12 and the light valve 11. The processor 15 is electrically connected to the distance measuring module 13 and the lens position detection module 14. The processor 15 receives the first distance value detected by the distance measuring module 13 and the second distance value detected by the lens position detection module 14. The processor 15 obtains an effective focus range according to the second distance value (as shown in FIG. 2 to FIG. 4), and at this time, the processor 15 determines the relationship between the obtained effective focus range and the first distance value. If the processor 15 determines that the first distance value is outside the effective focus range, the processor 15 drives the lens module 12 to move, so that the first distance value enters the effective focus range.

The following further describes the detailed structure of the projection apparatus 1 and the detailed auto-focusing method in the embodiment.

As shown in FIG. 1, the projection apparatus 1 of the embodiment further includes a driving unit 16. The driving unit 16 is electrically connected to the processor 15. In the embodiment, when the processor 15 determines that the first distance value is outside the effective focus range, the processor 15 controls the driving unit 16 to drive the lens module 12 to move.

Further, the light valve 11 is, for example, a reflective or transmissive spatial light modulator (SLM). When a reflective spatial light modulator is taken as an example, the light valve 11 may be a reflective liquid crystal on silicon (LCOS) or a digital micro-mirror device (DMD) or the like. When a transmissive spatial light modulator is taken as an example, the light valve 11 may be a transparent liquid crystal panel. In addition, depending on the manner in which the control signal is input, the light valve 11 is, for example, an optically addressed spatial light modulator (OASLM) or an electrically addressed spatial light modulator (EASLM), and the invention does not limit the form and type of the light valve 11. In addition, according to different methods of inputting the control signal, the light valve 11 may be an optically addressed spatial light modulator (OASLM) or an electrically addressed spatial light modulator (EASLM), the form and the type of the light valve 11 are not limited in the invention. The processor 15 is, for example, a central processing unit (CPU), or a microprocessor, digital signal processor (DSP), programmable controller, application specific integrated circuits (ASIC), programmable logic device (PLD) or a combination of the above devices for general or specific application, and the invention is not limited thereto. In addition, the lens module 12 has a plurality of lenses. The driving unit 16 may be composed of a motor, a gear set, and the like, and may connect and drive the lens module 12 so that the lens module 12 moves in the horizontal direction. The distance measuring module 13 of the invention may be an infrared focus device, ultrasonic focus device and camera focus device, and the aforementioned devices may be used to obtain the first distance value. In detail, in the infrared focus method, the projector actively emits an infrared signal to a projection surface on which the projector projects, and the projector performs the focusing according to the infrared ray reflected from the projection surface and received by a receiver. In the ultrasonic focus method, an ultrasonic wave oscillator generates a continuous ultrasonic wave. The ultrasonic signal returns to the receiver of the projector when the ultrasonic wave reaches the projection surface, and the projector computes the focus distance according to the round trip time of the ultrasonic wave. In the camera focus method, the camera captures the projection image, computes the captured image data captured, and then performs the focusing according to the computation result, but the invention is not limited thereto.

The lens position detection module 14 of the invention has, for example, a variable resistor. The lens position detection module 14 is connected to the lens module 12. The driving unit 16 drives the lens module 12 so that the resistance value changes, and the lens position detection module 14 can convert the signal into a signal value by detecting the change of the resistance value and provide it to the processor 15. The processor 15 can determine the current position of the lens module 12.

Figure 2A:
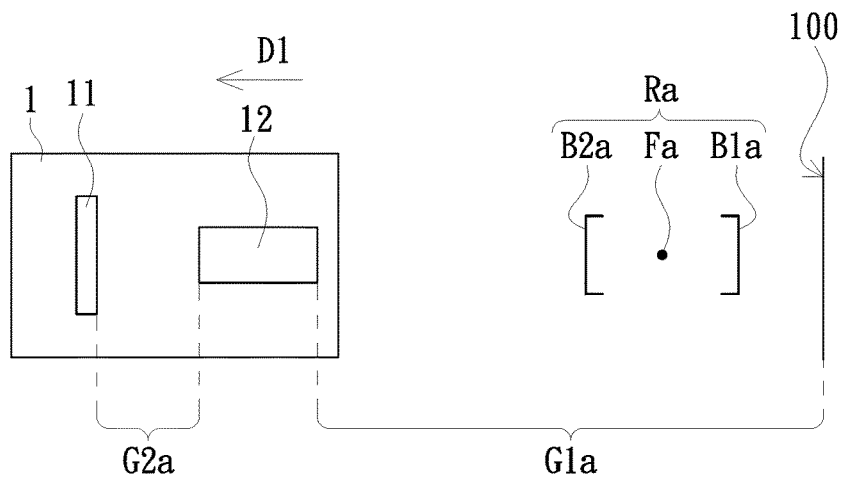
FIG. 2A to FIG. 2C are schematic views of a projection apparatus 1 according to an embodiment of the invention in an auto-focusing state.
Figure 2B:
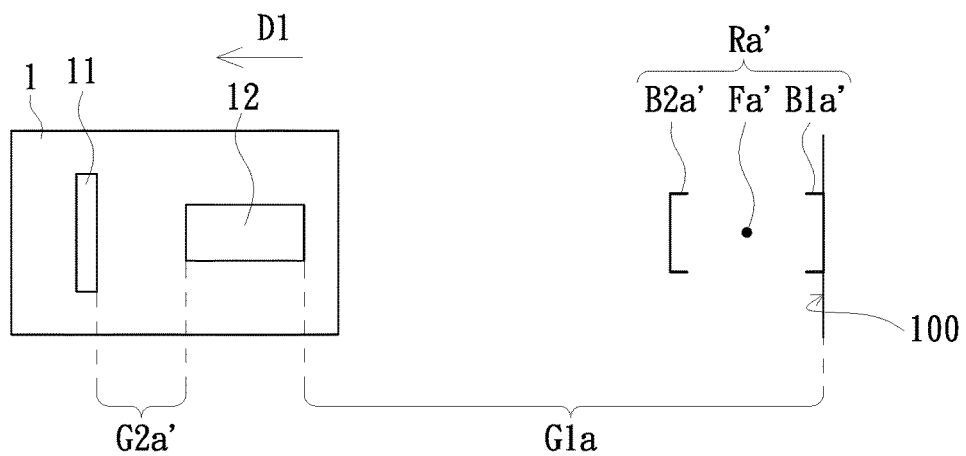
Figure 2C:
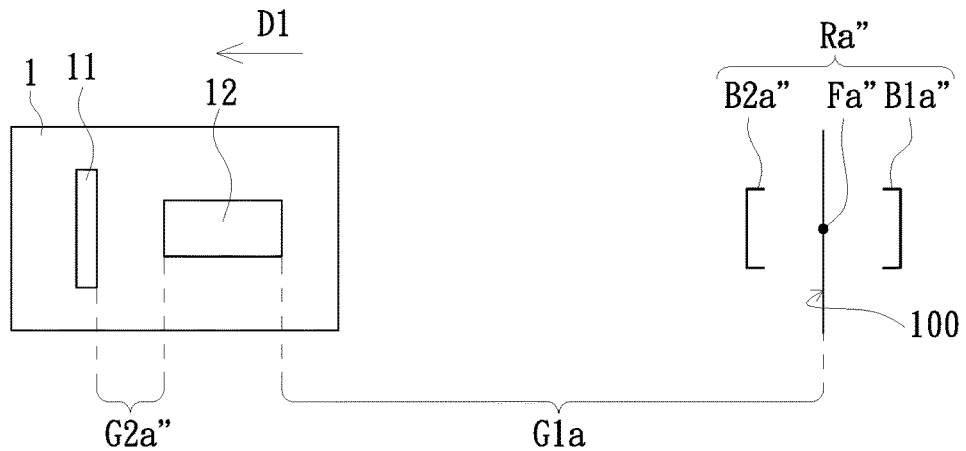

FIG. 2A to FIG. 2C are schematic views of a projection apparatus 1 according to an embodiment of the invention in an auto-focusing state. As shown in FIG. 1 to FIG. 2C, the processor 15 of the embodiment receives the first distance value G1$a$ measured by the distance measuring module 13 and the second distance value G2$a$ measured by the lens position detection module 14. The processor 15 obtains the effective focus range Ra according to the second distance value G2$a$. In the embodiment, the effective focus range Ra is an effective focus value Fa, a far end boundary value B1$a$ and a near end boundary value B2$a$, wherein the far end boundary value B1$a$ and a near end boundary value B2$a$ are defined according to the effective focus value Fa. When the processor 15 determines that the first distance value G1$a$ is greater than the far end boundary value B1$a$ of the effective focus range Ra (as shown in FIG. 2A), the processor 15 controls the driving unit 16 to drive the lens module 12 to move in the first direction D1 at the first speed. As the lens module 12 moves in the first direction D1, the distance between the lens module 12 and the light valve 11 changes, and the processor 15 obtains another effective focus range Ra' (as shown in FIG. 2B) according to the changed second distance value G2$a$' measured by the lens position detection module 14. The effective focus range Ra' includes an effective focus value Fa', a far end boundary value B1$a$' and a near end boundary value B2$a$', wherein the far end boundary value B1$a$' and the near end boundary value B2$a$' are defined according to the effective focus value Fa'. The far end boundary value B1$a$' of the effective focus range Ra' at this time is equal to the first distance value G1$a$, that is, the first distance value G1$a$ is within the effective focus range Ra', and thus the projection apparatus 1 can project a clear image. Furthermore, the effective focus value Fa is the effective focus value of the lens module 12, the far end boundary value B1$a$ represents the farthest distance from the lens module 12 within the effective focus range Ra', and the near end boundary value B2$a$ represents the closest distance from the lens module 12 within the effective focus range Ra'.

When the processor 15 determines that the first distance value G1$a$ is equal to the far end boundary value B1$a$' of the effective focus range Ra' (as shown in FIG. 2B), the processor 15 controls the driving unit 16 to drive the lens module 12 to move in the first direction D1 at the second speed. As the lens module 12 moves in the first direction D1, the distance between the lens module 12 and the light valve 11 changes, and the processor 15 obtains another effective focus range Ra" according to the changed second distance value G2$a$" measured by the lens position detection module 14. The effective focus range Ra" includes an effective focus value Fa", a far end boundary value B1$a$" and a near end boundary value B2$a$", wherein the far end boundary value B1$a$" and the near end boundary value B2$a$" are defined according to the effective focus value Fa'. The far end boundary value B1$a$' of the effective focus range Ra" is equal to the first distance value G1$a$ (as shown in FIG. 2C), so that the projection apparatus 1 can project a much clearer image than the state shown in FIG. 2B. In particular, in the embodiment, as shown in FIG. 2B, the processor 15 drives the lens module 12, for example, to move in the first direction D1 in a high-speed state; and as shown in FIG. 2C, the processor 15 drives the lens module 12, for example, to move in the first direction D1 in a low-speed state. That is, the above second speed is less than the above first speed. For detailed description, reference may be made to FIG. 6 and related descriptions.

Figure 3A:
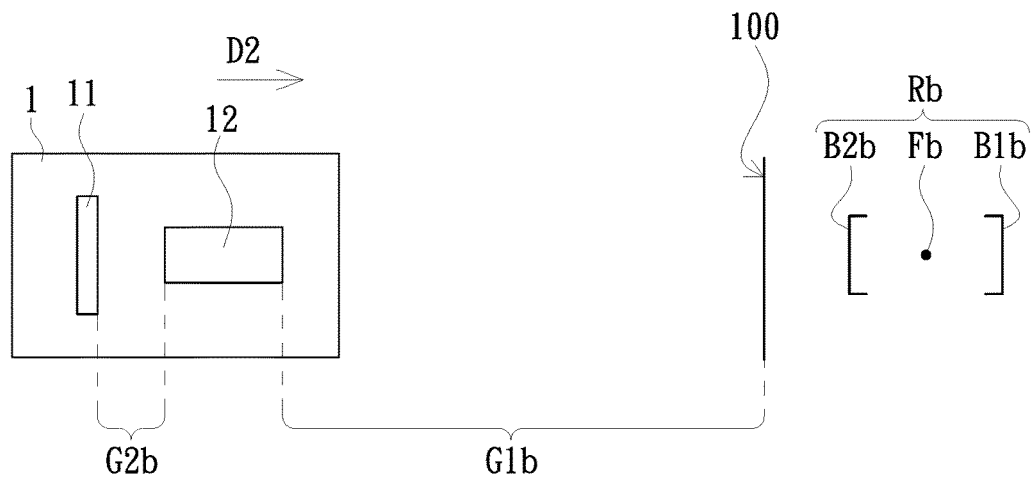
FIG. 3A to FIG. 3C are schematic views of a projection apparatus 1 according to an embodiment of the invention in another auto-focusing state.
Figure 3B:
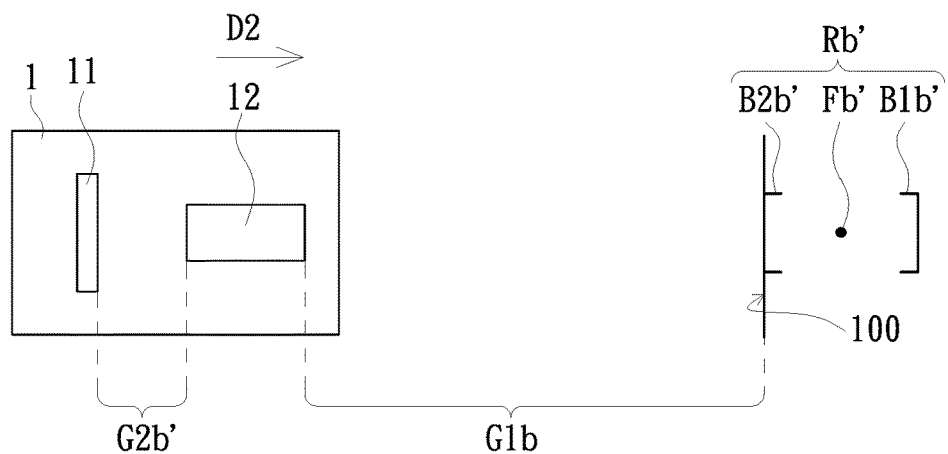
Figure 3C:
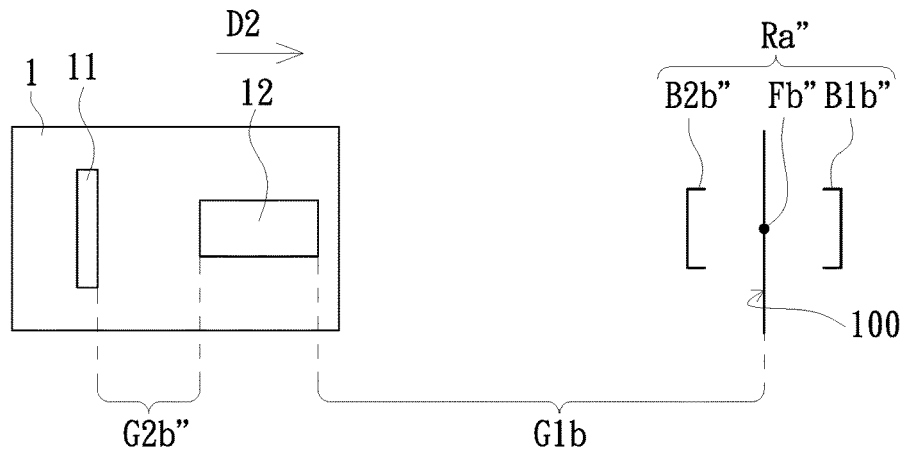
Figure 4:
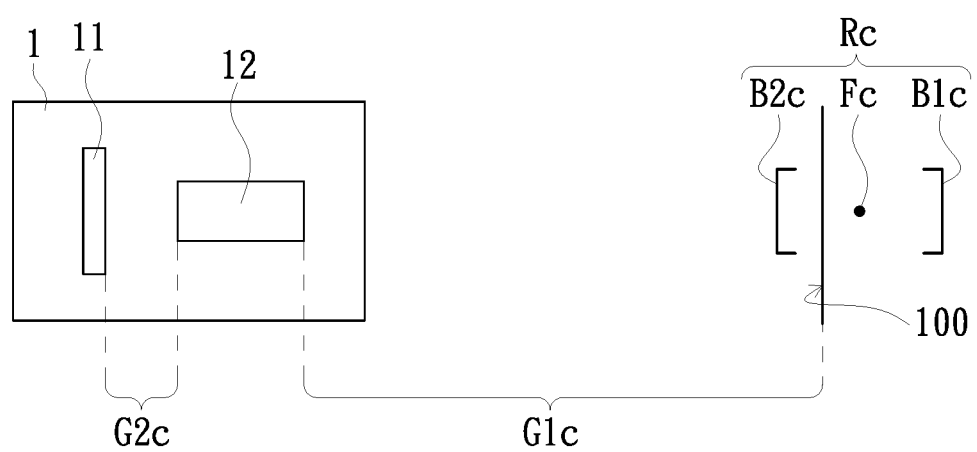
FIG. 4 is a schematic view of a projection apparatus 1 according to an embodiment of the invention in another auto-focus state.

FIG. 3A to FIG. 3C are schematic views of a projection apparatus 1 according to an embodiment of the invention in another auto-focusing state. As shown in FIG. 1 and FIG. 3A to FIG. 3C, the processor 15 of the embodiment receives the first distance value G1$b$ measured by the distance measuring module 13 and the second distance value G2$b$ measured by the lens position detection module 14. The processor 15 obtains the effective focus range Rb according to the second distance value G2$b$. In the embodiment, the effective focus range Rb is an effective focus value Fb, a far end boundary value B1$b$ and a near end boundary value B2$b$, wherein the far end boundary value B1$b$ and the near end boundary value B2$b$ are defined according to the effective focus value Fb. When the processor 15 determines that the first distance value G1$b$ is less than the near end boundary value B2$b$ of the effective focus range Rb (as shown in FIG. 3A), the processor 15 controls the driving unit 16 to drive the lens module 12 to move in the second direction D2 at the first speed (high speed). As the lens module 12 moves in the second direction D2, the distance between the lens module 12 and the light valve 11 changes. The processor 15 obtains another effective focus range Rb' (as shown in FIG. 3B) according to the changed second distance value G2$b$' measured by the lens position detection module 14. The effective focus range Rb' includes an effective focus value Fb', a far end boundary value B1$b$' and a near end boundary value B2$b$', wherein the far end boundary value B1$b$' and the near end boundary value B2b' are defined according to the effective focus value Fb'. The near end boundary value B2b' of the effective focus range Rb' is equal to the first distance value G1b, that is, the first distance value G1b is within the effective focus range Rb', and thus the projection apparatus 1 can project a clear image.

When the processor 15 determines that the first distance value G1b is equal to the near end boundary value B2b' of the effective focus range Rb' (as shown in FIG. 3B), the processor 15 controls the driving unit 16 to drive the lens module 12 to move in the second direction D2 at the second speed (low speed). As the lens module 12 moves in the second direction D2, the distance between the lens module 12 and the light valve 11 changes, and the processor 15 obtains another effective focus range Rb" according to the changed second distance value G2b" measured by the lens position detection module 14. The effective focus range Rb" includes an effective focus value Fb", a far end boundary value B1b" and a near end boundary value B2b", wherein the far end boundary value B1b" and the near end boundary value B2b" are defined according to the effective focus value Fb". The effective focus value Fb" of the effective focus range Rab" is equal to the first distance value G1b (as shown in FIG. 3C), so that the projection apparatus 1 can project a much clearer image than the state shown in FIG. 3B.

FIG. 4 is a schematic view of a projection apparatus 1 according to an embodiment of the invention in another auto-focusing state. As shown in FIG. 4, the processor 15 of the embodiment receives the first distance value G1c measured by the distance measuring module 13 and the second distance value G2c measured by the lens position detection module 14. The processor 15 obtains an effective focus range Rc according to the second distance value G2c. In the embodiment, the effective focus range Rc is an effective focus value Fc, a far end boundary value B1c and a near end boundary value B2c, wherein the far end boundary value B1c and the near end boundary value B2c are defined according to the effective focus value Fc. When the processor 15 determines that the first distance value G1c is greater than the near end boundary value B2c of the effective focus range Rc and less than the far end boundary value B1c of the effective focus range Rc, the processor 15 drives the lens module 12 to move at the second speed (low speed). The effective focus value Fc of the effective focus range Rc is equal to the first distance value G1c, and thus the projection apparatus 1 can project a clear image. In another embodiment, the effective focus range Rc is the effective focus value Fc, the far end boundary value B1c and the near end boundary value B2c, wherein the far end boundary value B1c and the near end boundary value B2c are defined according to the effective focus value Fc. When the processor 15 determines that the first distance value G1c is greater than the near end boundary value B2c of the effective focus range Rc and less than the far end boundary value B1c of the effective focus range Rc, the processor 15 does not drive the lens module 12 to move. That is, when the first distance value G1c is between the far end boundary value B1c and the near end boundary value B2c, the projection apparatus 1 may also project a clear image observable by the observer without performing auto-focusing.

It should be particularly noted that the above-mentioned effective focal ranges Ra, Rb, Rc, Ra', Rb', Ra' and Rb" refer to a range of depth of field of an image projected by the projection apparatus 1, that is, a relatively clear imaging range before and after the effective focal values Fa, Fa', Fa", Fb, Fb', Fb" and Fc. The far boundary values B1a, B1a', B1a", B1b, B1b', B1b" and B1c are the deep depth boundaries of the depth of field range. The near boundary values B2a, B2a', B2a", B2b, B2b', B2b" and B2c are near field depth boundaries of the depth of field range.

As shown in FIG. 1, the projection apparatus 1 of the embodiment further includes a storage unit 17 and a lookup table 170 stored in the storage unit 17. The storage unit 17 is, for example, a random access memory (RAM), a read-only memory (ROM), a flash memory, or a similar element or a combination of the above elements, and the invention is not limited thereto. The storage unit 17 is electrically connected to the processor 15. The processor 15 reads the lookup table 170 stored in the storage unit 17 and further compares, according to the second distance values G2a, G2a', G2a", G2b, G2b', G2b" and G2c shown in FIG. 2A to FIG. 4, the lookup table 170 to obtain the effective focus values Fa, Fa', Fa", Fb, Fb', Fb", Fc, the far end boundary values B1a, B1a', B1a", B1b, B1b', B1b", B1c and the near end boundary values B2a, B2a', B2a", B2b, B2b', B2b", B2c shown in FIG. 2A to FIG. 4. It should be particularly noted that the processor 15 obtaining the effective focus value, the far end boundary value and the near end boundary value by reading the lookup table 170 stored in the storage unit 17 is only an embodiment of the invention, and the invention is not limited thereto. In other embodiments, the processor 15 reads a computing program stored in the storage unit 17 and further computes, according to the second distance values G2a, G2a', G2a", G2b, G2b', G2b", G2c shown in FIG. 2A to FIG. 4, to obtain the effective focus values Fa, Fa', Fa", Fb, Fb', Fb", Fc, the far end boundary values B1a, B1a', B1a", B1b, B1b', B1b", B1c and the near end boundary values B2a, B2a', B2a", B2b, B2b', B2b", B2c shown in FIG. 2A to FIG. 4. The computing program may have a depth of field formula known to a person in this field to obtain the effective focal values, the far boundary values and the near boundary values. Further, the depth of field formula can be used to calculate the effective focal values and the far and near boundary values defined by the effective focal values.

Figure 5:
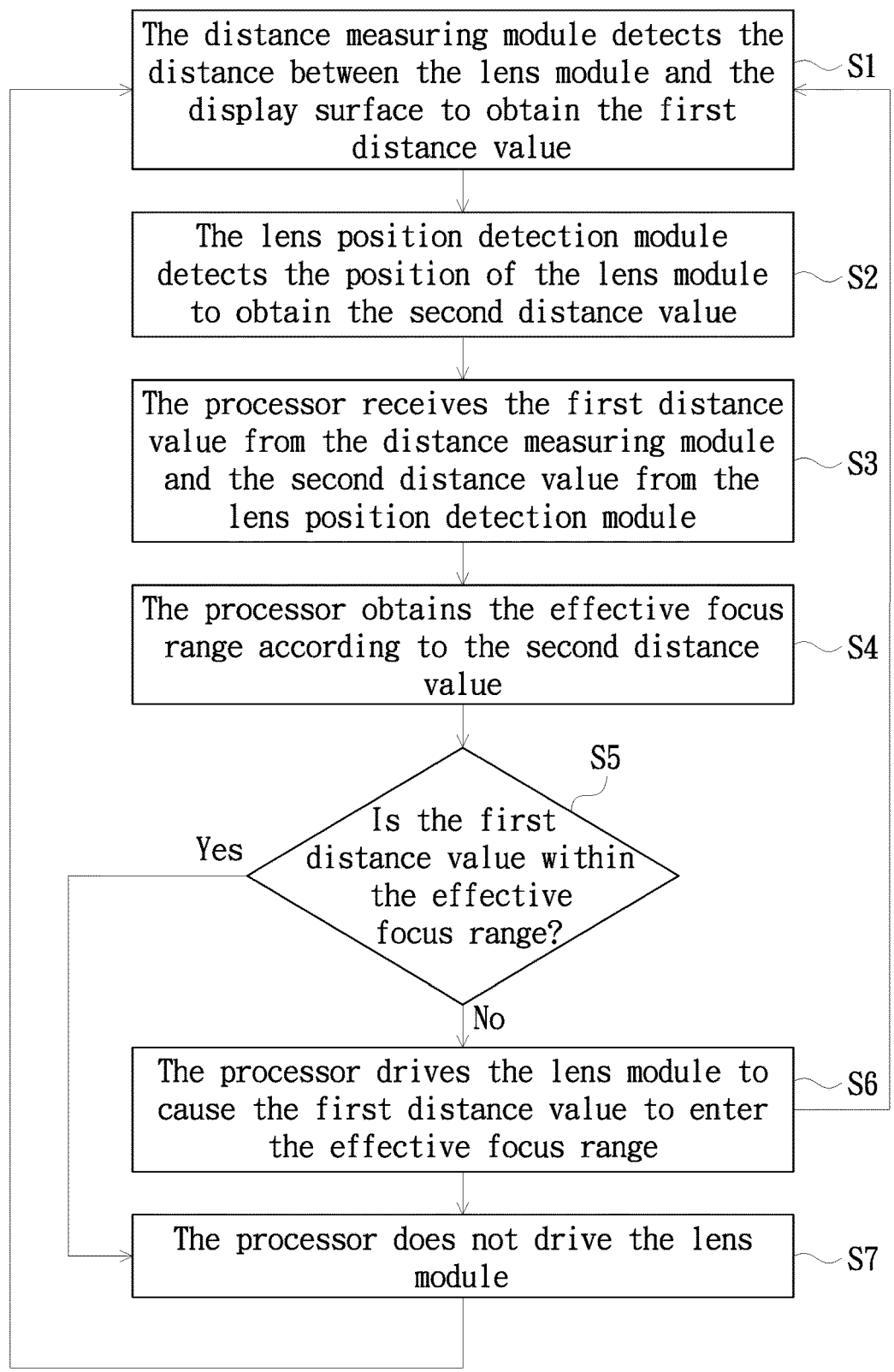
FIG. 5 is a flowchart of an auto-focusing method of an embodiment of the invention.

FIG. 5 is a flowchart of an auto-focusing method of an embodiment of the invention. The auto-focusing method of the embodiment is applied to the projection apparatus 1 shown in FIG. 1 to FIG. 4. As shown in FIG. 5 and refer to FIG. 1 to FIG. 4, the auto-focusing method of the embodiment includes the following steps: first, as shown in step S1, the distance measuring module 13 detects the distance H1 between the lens module 12 and the display surface 100 to obtain the first distance value; thereafter, as shown in step S2, the lens position detection module 14 detects the position of the lens module 12 to obtain the second distance value; thereafter, as shown in step S3, the processor 15 receives the first distance value from the distance measuring module 13 and the second distance value from the lens position detection module 14; thereafter, as shown in step S4, the processor 15 obtains the effective focus range according to the second distance value; thereafter, as shown in step S5, the processor 15 determines whether the first distance value is within the effective focus range; when the processor 15 determines that the first distance value is outside the effective focus range, then as shown in step S6, the processor 15 drives the lens module 12 to cause the first distance value to enter the effective focus range; when the processor 15 determines that the first distance value is within the effective focus range, then as shown in step S7, the processor 15 does not drive the lens module 12.

It should be particularly noted that in the above steps of the auto-focusing method, the order of the distance measuring module 13 first detecting the distance H1 between the lens module 12 and the display surface 100 to obtain the first distance value (as shown in step S1) and the lens position detection module 12 then detecting the position of the lens module 12 to obtain the second distance value (as shown in step S2) is only an embodiment of the invention, and the invention is not limited thereto. In other embodiments, the lens position detection module 12 first detects the position of the lens module 12 to obtain the second distance value and then the distance measuring module 13 detects the distance H1 between the lens module 12 and the display surface 100 to obtain the first distance value, that is, the step S1 and the step S2 shown in FIG. 5 are reversed to each other.

As shown in FIG. 5, in step S4 and step S5 of the auto-focusing method of the embodiment, the processor 15 reads the lookup table 170 shown in FIG. 6 from the storage unit 17 for example and then compares the lookup table 170 to obtain the effective focus value, the far end boundary value and the near end boundary value of the effective focus range according to the second distance value measured by the lens position detection module 12 detecting the lens module 12. The processor 15 then determines whether the first distance value is within the range of the far end boundary value and the near end boundary value so as to determine whether to drive the lens module 12 to perform the auto-focusing. For example, when the second distance obtained by the lens position detection module 12 detecting the position of the lens module 12 is 8 cm, the far end boundary value obtained by comparing the lookup table 170 is 11 cm and the near end boundary value is 6 cm. At this time, the position of the lens module 12 is at the 10-step position (compared with the initial position of the lens module 12). If the first distance value obtained by the distance measuring module 13 detecting the distance between the lens module 12 and the display surface 100 is 5 cm, at this time, the processor 15 determines that the first distance value is not within the range of the far end boundary value of 11 cm and the near end boundary value of 6 cm, and then the processor 15 drives the lens module 12 to move. In the embodiment, the lens module 12 moving 1 cm may cause 6.8 steps of adjustment, but the invention is not limited thereto. That is, to enter the first distance value within the effective focus range, the processor 15 drives the lens module 12 to move 1 cm (6.8 steps) so that the near end boundary value of the effective focus range is equal to the first distance value. In an embodiment and with reference to FIGS. 2A-2C, FIGS. 3A-3C and the corresponding paragraph, it can be known that the first speed may be 50 cm per 340 steps (6.8 steps/cm) and the second speed may be smaller than the first speed. When the processor 15 determines that the first distance value G1$a$ is within the effective focus range R$a$' (as shown in FIG. 2B and FIG. 3B), the processor 15 controls the driving unit 16 to drive the lens module 12 to move toward the first direction D1 or the second direction D2 at the second speed, that is, the lens module 12 moving at the second speed may cause the first distance value G1$a$ to be adjusted to the effective focus value F$a$" or F$b$" under the condition that the observer is not aware of it.

In summary, according to the projection apparatus and auto-focusing method in the embodiment of the invention, the first distance value is obtained by the distance measuring module detecting the distance between the lens module and the display surface, the second distance value is then obtained by the lens position detection module detecting the position of the lens module, the processor obtains the effective focus range according to the second distance value, and then the processor determines the relationship between the first distance value and the effective focus value. When the processor determines that the first distance value is outside the effective focus range, the processor drives the lens module to move to cause the first distance value to be within the effective focus range. When the processor determines that the first distance value is within the effective focus range, the processor does not drive the lens module to move. Different from the auto-focusing method of the prior art, the projection apparatus and auto-focusing method in the embodiment of the invention can achieve faster auto-focusing.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A projection apparatus, comprising:
   a light valve adapted to form an image beam;
   a lens module adapted to project the image beam onto a display surface;
   a distance measuring module adapted to detect a distance between the lens module and the display surface to obtain a first distance value;

a lens position detection module adapted to detect a position of the lens module to obtain a second distance value; and a processor electrically connected to the distance measuring module and the lens position detection module, wherein the processor receives the first distance value from the distance measuring module, receives the second distance value from the lens position detection module, and obtains an effective focus range according to the second distance value, wherein when the processor determines that the first distance value is outside the effective focus range, the processor drives the lens module so that the first distance value enters the effective focus range, wherein the effective focus range is an effective focus value, a far end boundary value and a near end boundary value, wherein the far end boundary value and the near end boundary value are defined according to the effective focus value.

2. The projection apparatus according to claim 1, wherein when the processor determines that the first distance value is within the effective focus range, the processor does not drive the lens module.

3. The projection apparatus according to claim 1, further comprising a storage unit and a lookup table stored in the storage unit, wherein the storage unit is electrically connected to the processor, and the processor reads the lookup table and compares the lookup table according to the second distance value to obtain the effective focus value, the far end boundary value and the near end boundary value.

4. The projection apparatus according to claim 1, further comprising a storage unit and a computing program stored in the storage unit, wherein the storage unit is electrically connected to the processor, and the processor reads the computing program and computes the effective focus value, the far end boundary value and the near end boundary value according to the second distance value.

5. The projection apparatus according to claim 1, wherein when the processor determines that the first distance value is greater than the far end boundary value, the processor drives the lens module to move at a first speed so that the far end boundary value is equal to the first distance value, wherein when the processor determines that the first distance value is less than the near end boundary value, the processor drives the lens module to move at the first speed so that the near end boundary value is equal to the first distance value.

6. The projection apparatus according to claim 5, wherein when the processor determines that the first distance value is equal to the far end boundary value or the first distance value is equal to the near end boundary value, the processor drives the lens module to move at a second speed so that the effective focus value is equal to the first distance value, wherein the second speed is smaller than the first speed.

7. The projection apparatus according to claim 1, further comprising a driving unit, wherein the driving unit is electrically connected to the processor, and when the processor determines that the first distance value is greater than the far end boundary value or the first distance value is smaller than the near end boundary value, the processor controls the driving unit to drive the lens module.

8. An auto-focusing method for adjusting a distance between a projection apparatus and a display surface, the projection apparatus comprising a light valve, a lens module, a distance measuring module, a lens position detection module and a processor, and the auto-focusing method comprising steps of:

configuring the processor to receive a first distance value from the distance measuring module and a second distance value from the lens position detection module, wherein the first distance value is a distance between the lens module and the display surface, and the second distance value is a position of the lens module;

obtaining an effective focus range according to the second distance value;

determining whether the first distance value is within the effective focus range; and when the processor determines that the first distance value is outside the effective focus range, configuring the processor to drive the lens module so that the first distance value enters the effective focus range, wherein the effective focus range is an effective focus value, a far end boundary value and a near end boundary value, wherein the far end boundary value and the near end boundary value are defined according to the effective focus value.

9. The auto-focusing method according to claim 8, further comprising a step of:

when the processor determines that the first distance value is within the effective focus range, configuring the processor not to drive the lens module.

10. The auto-focusing method according to claim 8, further comprising a step of:

when the processor determines that the first distance value is within the effective focus range, configuring the processor to drive the lens module to move so that the effective focus value is equal to the first distance value.

11. The auto-focusing method according to claim 8, wherein before the step of configuring the processor to receive a first distance value from the distance measuring module and a second distance value from the lens position detection module, the auto-focusing method comprises steps of:

configuring the distance measuring module to detect the distance between the lens module and the display surface to obtain the first distance value; and configuring the lens position detection module to detect the position of the lens module to obtain the second distance value.

12. The auto-focusing method according to claim 8, wherein before the step of configuring the processor to receive a first distance value from the distance measuring module and a second distance value from the lens position detection module, the auto-focusing method comprises steps of:

configuring the lens position detection module to detect the position of the lens module to obtain the second distance value; and configuring the distance measuring module to detect the distance between the lens module and the display surface to obtain the first distance value.

13. The auto-focusing method according to claim 8, wherein when the processor determines that the first distance value is greater than the far end boundary value, the processor drives the lens module to move at a first speed so that the far end boundary value is equal to the first distance value, wherein when the processor determines that the first distance value is less than the near end boundary value, the processor drives the lens module to move at the first speed so that the near end boundary value is equal to the first distance value.

14. The auto-focusing method according to claim 13, further comprising a step of:

when the processor determines that the first distance value is equal to the far end boundary value or the first distance value is equal to the near end boundary value, configuring the processor to drive the lens module to move at a second speed so that the effective focus value is equal to the first distance value, wherein the second speed is smaller than the first speed.

15. The auto-focusing method according to claim 8, wherein the processor compares a lookup table according to the second distance value to obtain the effective focus value, the far end boundary value and the near end boundary value.

16. The auto-focusing method according to claim 8, wherein the processor computes the effective focus value, the far end boundary value and the near end boundary value in a computing program according to the second distance value.

\* \* \* \* \*